United States Patent [19]
Daval et al.

[11] 3,758,194
[45] Sept. 11, 1973

[54] INTERFEROMETRIC MODULATOR FOR USE IN NATURAL LIGHT

[75] Inventors: Jacques Daval, Meylan; Francis Forrat, Grenoble, both of France

[73] Assignee: Commissariat A L'Energie Atomique, Paris, France

[22] Filed: May 5, 1972

[21] Appl. No.: 250,817

[52] U.S. Cl. ............................ 350/160 R, 356/112
[51] Int. Cl. ............................................. G02f 1/36
[58] Field of Search .................. 350/160; 356/112; 331/94.5

[56] References Cited
UNITED STATES PATENTS
3,612,655   10/1971   Buchan et al. ................ 350/160 R
3,699,347   10/1972   Buchan et al. ................ 350/160 R

*Primary Examiner*—William L. Sikes
*Attorney*—Cameron, Kerkam & Sutton

[57] ABSTRACT

The interferometric modulator comprises a plate having parallel faces and cut at right angles to the optic axis in a uniaxial crystal of the type which produces an electro-optical effect and retains its uniaxial character for an electric field applied along the optic axis, and two flat, semi-transparent electrodes placed at right angles to the faces of the plate. A variable voltage is applied between the electrodes so as to vary the refractive index of the crystal for a beam of natural light which strikes the optical system in a direction close to the optic axis and undergoes a series of internal reflections from the electrodes.

4 Claims, 1 Drawing Figure

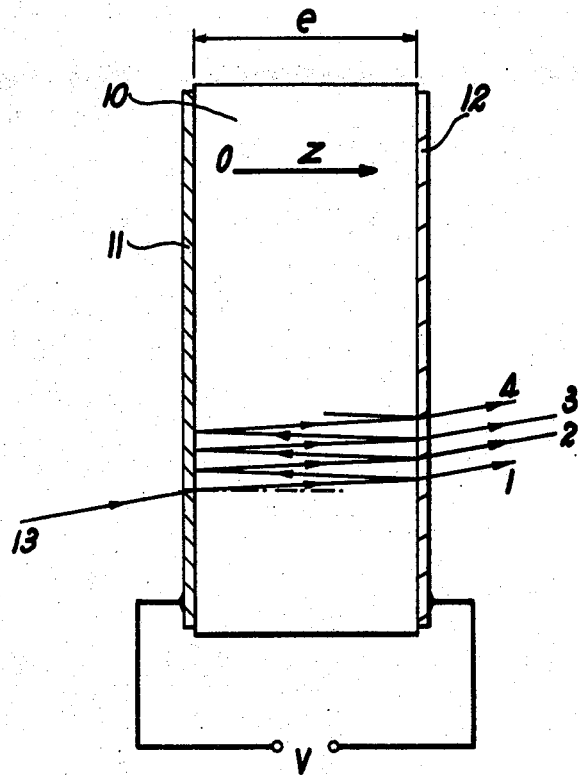

INTERFEROMETRIC MODULATOR FOR USE IN NATURAL LIGHT

Up to the present time, all interferometric light modulators which utilize the linear electro-optical effect, whether they may be of the two-wave or multiple-wave type (such as the Fabry-Perot interferometer), make use of electro-optical crystals which are biaxial when they are subjected to an electric field.

In order that the two phase-shifted light vibrations which pass out of the biaxial polarized crystal should be capable of interfering and in order that it should be possible to modulate the resultant intensity, it is essential to place the crystal between the polarizer and analyzer which are in parallel relation. Devices of this type modulate only the polarized light, which sets a considerable limitation on their efficiency and their field of action. In fact, when light is polarized either linearly (by means of a Nicol polarizer) or circularly (by means of a Nicol prism and a quarter-wave plate), the loss of incident light amounts to 50 percent at the outset.

The present invention has for its object an interferometric modulator which is similar to the multiple-wave devices of the Fabry-Perot type involving the use of the linear electro-optical effect, and which is capable of modulating the intensity of a non-polarized natural light beam.

The aim of the invention is to provide an interferometric modulator which essentially comprises a plate having parallel faces and cut at right angles to the optic axis in a uniaxial crystal of the type which has an electro-optical effect and retains its uniaxial character when it is subjected to an electric field applied along the optic axis, between two semi-transparent electrodes disposed respectively on said faces of the plate, and means for applying a variable voltage between said electrodes in order to vary the refractive index of the crystal in the case of a beam which strikes said optical system in a direction having only a slight deviation from the optic axis of the crystal and which is subjected within the crystal to a series of reflections from said electrodes.

The crystals which can be employed belong to the classes of symmetry 4, 4 mm, 3, 3 m, 6 and 6 mm which are characterized by a hydrostatic piezoelectric modulus of compression and torsion, and especially to the classes 4 mm, 3 m and 6.

More detailed explanations in regard to the design concept of this novel interferometric modulator will be given in the following description with reference to the single FIGURE of the accompanying drawing.

As shown in this figure, the modulator herein described comprises for the purpose of constituting the optical system, a plate 10 having parallel faces which is cut and oriented in a uniaxial crystal and having a thickness $e$ along the optic axis OZ of the crystal. The two faces of this plate are covered by two semi-transparent electrodes 11 and 12 constituted by one or a number of conductive deposits obtained by vacuum evaporation or spraying and having, on the crystal side, a coefficient of reflection R in the vicinity of 0.80; there can be applied between these two electrodes a voltage V having a variable and adjustable value.

The uniaxial crystal which constitutes the plate 10 is selected from the non-centrosymmetrical classes of symmetry having a hydrostatic piezoelectric modulus of compression and of torsion, that is to say from the classes 4, 4 mm, 3, 3 m, 6 and 6 mm. Crystals of this type retain an indicatrix of revolution when the applied external stress (uniaxial electric field) possesses the symmetry of the crystal; in other words, these crystals remain optically uniaxial when the electric field is applied along the optic axis OZ.

Under these conditions, the modulation of the control voltage results in a modulation of the ordinary index of refraction in the case of the light beam 13 which propagates in the crystal in a direction parallel to the optic axis OZ. Owing to the presence of semi-transparent electrodes having high reflecting power, the light vibration undergoes successive reflections within the crystal and gives rise to a series of emergent rays 1, 2, 3, 4, and so forth, which produce a system of infinite interference fringes (for example in the focal plane of an object-lens).

A simple calculation shows that the phase difference $\phi_{12}$ between two adjacent emergent rays, namely 1 and 2 for example, is of the form:

$$\phi_{12} = 2\pi/\lambda = (2n'_o \, e \cos r) \quad (1)$$

$\lambda$ : wavelength
$n'_o : n_o + \Delta n_o$
$n_o$ : ordinary index of the crystal in a zero electric field
$\Delta n_o$ : variation in the ordinary index resulting from the application of an electric field.

Under the particular conditions hereinabove defined in regard to the orientation of the crystal, the application of the electric field, the propagation of light, and assuming in addition that the frequency is sufficiently high and the dimensions of the crystal are such that only the primary electro-optical effect arises:

$$\phi_{12} = (4\pi/\lambda) \, n_o \, e \cos r + (2\pi/\lambda) \, n_o r_{13} V \cos r \quad (2)$$

$r_{13}$ : the only electro-optical coefficient which produces action on the light vibration.
$V$ : control voltage.

In the plane of obsrvation of the fringes, the distribution of light intensity is given by the formula:

$$I = I_{max} \cdot (1)/(1 + m \sin^2 \phi/2) \quad (3)$$

$m$ : coefficient of fineness $= 4R/(1-R)^2 \quad (4)$ $R$ : coefficient of reflection at the internal electrode faces.

A maximum value of intensity is observed each time $\sin^2 \phi/2 = 0$ where $\phi/2 \, p \, \pi$ ($p$ being a whole number) namely $$(2\pi/\lambda) \, n_o \, e \cos r + (\pi/\lambda) n_o^3 \, r_{13} \, V \cos r = p \, \pi \quad (5)$$

or else:

$$2 \, n_o \, e \cos r + n_o^3 \, r_{13} \, V \cos r = p \, \lambda \quad (6)$$

And as the light beam arrives at an angle of incidence which is very close to the normal ($\cos r \neq 1$):

$$2 n_o e + n_o^3 r_{13} V = p \lambda \quad (7)$$

The minimum intensity is obtained for the values of $V$ which satisfy the relation:

$$2 n_o e + n_o^3 r_{13} V = (p + \tfrac{1}{2}) \lambda \quad (9)$$

Between these extreme values, the output intensity can be modulated at will solely by modulating the control voltage $V$ since the optical thickness $n_o e$ is constant.

In order to specify the chemical composition of the uniaxial crystals which are advantageously employed in the application of this invention, the present applicant can mention in particular the bromates, chlorates and iodates of alkali metals and of thallium. These latter belong to the classes of symmetry 4 mm, 3 m and 6 and are listed in the following table:

| Designation | Formula | Crystal System | Class of Symmetry | Transparency |
|---|---|---|---|---|
| Potassium iodate | $KIO_3$ | tetragonal | 4 mm | visible |
| Rubidium iodate | $RbIO_3$ | (perovskite type) | 4 mm | visible |
| Caesium iodate CsIO | $CsIO$ | | 4 mm | visible |
| Potassium bromate | $KBrO_3$ | | 3 m | visible |
| Rubidium bromate | $RbBrO_3$ | trigonal | 3 m | visible |
| Rubidium chlorate | $RbClO_3$ | or | 3 m | infra-red |
| Caesium bromate | $CsBrO_3$ | | 3 m | visible |
| Caesium chlorate | $CsClO_3$ | rhombohedral | 3 m | infra-red |
| Thallium bromate | $TlBrO_3$ | | 3 m | visible |
| Thallium chlorate | $TlClO_3$ | | 3 m | infra-red |
| Thallium iodate | $TlIO_3$ | | 3 m | visible |
| Lithium iodate | $LiIO_3$ | hexagonal | 6 | visible |

What we claim is:

1. An interferometric modulator for use in natural light, comprising an optical system including a plate having parallel faces and cut at right angles to the optical axis in a uniaxial crystal which produces a linear electro-optical effect and retains its uniaxial character in an electric field applied along the optic axis and two partially replacing flat electrodes disposed respectively on said faces of said plate, and means for applying a variable voltage between said electrodes to vary the refractive index of the crystal in a beam of natural light which strikes said optical system in a direction having only a slight deviation from the optic axis of the crystal, said beam undergoing a series of internal reflections from said electrodes, the crystal being selected from the classes of crystal symmetry consisting of 4 and 4 mm, 3 and 3 m, 6 and 6 mm, and 4 mm, 3 m and 6.

2. An interferometric modulator in accordance with claim 1, wherein said electrodes are metallic deposits.

3. An interferometric modulator in accordance with claim 1, wherein the crystal is selected from the group consisting of bromates, chlorates, iodats of alkali metals and thallium.

4. An interferometric modulator in accordance with claim 3, wherein the alkali metal is selected from the group consisting of potassium, rubidium and caesium.

* * * * *